United States Patent
Kreiner et al.

(10) Patent No.: US 10,713,222 B2
(45) Date of Patent: *Jul. 14, 2020

(54) CONVERSION OF DATA FOR OPERATING SYSTEMS

(71) Applicant: AT&T Intellectual Property I, L.P., Atlanta, GA (US)

(72) Inventors: Barrett M. Kreiner, Woodstock, GA (US); Jonathan L. Reeves, Roswell, GA (US); Ryan L. Schaub, Norcross, GA (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 220 days.

This patent is subject to a terminal disclaimer.

(21) Appl. No.: 15/900,932

(22) Filed: Feb. 21, 2018

(65) Prior Publication Data
US 2018/0181589 A1 Jun. 28, 2018

Related U.S. Application Data

(63) Continuation of application No. 12/856,236, filed on Aug. 13, 2010, now Pat. No. 9,934,244.

(51) Int. Cl.
*G06F 16/178* (2019.01)
(52) U.S. Cl.
CPC ................ *G06F 16/1794* (2019.01)
(58) Field of Classification Search
None
See application file for complete search history.

(56) References Cited

U.S. PATENT DOCUMENTS

| | | | |
|---|---|---|---|
| 5,627,996 A | 5/1997 | Bauer | |
| 5,911,772 A | 6/1999 | Guck | |
| 5,920,893 A | 7/1999 | Nakayama | |
| 6,085,199 A | 7/2000 | Rose | |
| 6,377,952 B1 | 4/2002 | Inohara et al. | |
| 6,377,958 B1 | 4/2002 | Orcutt | |
| 6,549,918 B1 | 4/2003 | Probert et al. | |
| 6,567,828 B2 | 5/2003 | Inohara et al. | |
| 6,654,794 B1 * | 11/2003 | French | H04L 29/06 709/217 |
| 6,871,245 B2 | 3/2005 | Bradley | |
| 6,889,256 B1 | 5/2005 | Palevich et al. | |
| 6,904,441 B2 | 6/2005 | Voight | |
| 6,988,101 B2 | 1/2006 | Ham et al. | |
| 7,080,131 B2 | 7/2006 | Palevich et al. | |
| 7,280,995 B1 | 10/2007 | Sedlar | |
| 7,437,375 B2 | 10/2008 | Borthakur et al. | |
| 7,441,012 B2 | 10/2008 | Palevich et al. | |

(Continued)

*Primary Examiner* — Uyen T Le
(74) *Attorney, Agent, or Firm* — Scott P. Zimmerman, PLLC

(57) ABSTRACT

Managed access to file system objects enables an application to request access to a file system object via a file system transformer driver, which may extend the capabilities of a file system. The file system transformer driver may be configured to convert a data file format for the file system object to a data format requested by the application. The file system transformer driver may store the file system object in an internal data format using a file system on a storage device. The file system transformer driver may receive requests from applications via an operating system instruction.

20 Claims, 7 Drawing Sheets

(56) References Cited

U.S. PATENT DOCUMENTS

| | | |
|---|---|---|
| 7,502,782 B2 | 3/2009 | Sedlar |
| 7,647,359 B1 | 1/2010 | Taysom |
| 7,877,516 B2 | 1/2011 | Giroux et al. |
| 7,979,665 B1 | 7/2011 | Todd et al. |
| 2003/0172347 A1 | 9/2003 | Gunn et al. |
| 2004/0049797 A1 | 3/2004 | Salmonsen |
| 2004/0220982 A1 | 11/2004 | Probert, Jr. |
| 2005/0027750 A1 | 2/2005 | Martin et al. |
| 2005/0175317 A1 | 8/2005 | Chung et al. |
| 2007/0288691 A1 | 12/2007 | Couvert et al. |
| 2009/0024806 A1 | 1/2009 | Bilger et al. |
| 2009/0055445 A1 | 2/2009 | Liu et al. |
| 2009/0172393 A1 | 7/2009 | Tanik et al. |
| 2010/0042868 A1 | 2/2010 | Apelbaum et al. |
| 2010/0205610 A1 | 8/2010 | Turnbull |
| 2010/0281214 A1 | 11/2010 | Jernigan, IV |
| 2010/0299369 A1 | 11/2010 | Kusumoto |
| 2011/0126104 A1 | 5/2011 | Woods et al. |

\* cited by examiner

CONVERSION OF DATA FOR OPERATING SYSTEMS

CROSS-REFERENCE TO RELATED APPLICATION

This application is a continuation of U.S. application Ser. No. 12/856,236 filed Aug. 13, 2010 and since issued as U.S. Pat. No. 9,934,244, and incorporated herein by reference in its entirety.

FIELD OF THE DISCLOSURE

The present disclosure relates to data conversion and, specifically, to file format management.

BACKGROUND

Description of the Related Art

Conversion of data files between different formats is a feature included with many applications that process data files. Many of such applications may provide import/export functionality for certain file formats or types of data files. In doing so, such applications may exclude other file formats or types of data files.

DESCRIPTION OF THE EMBODIMENT(S)

Figure 1A:
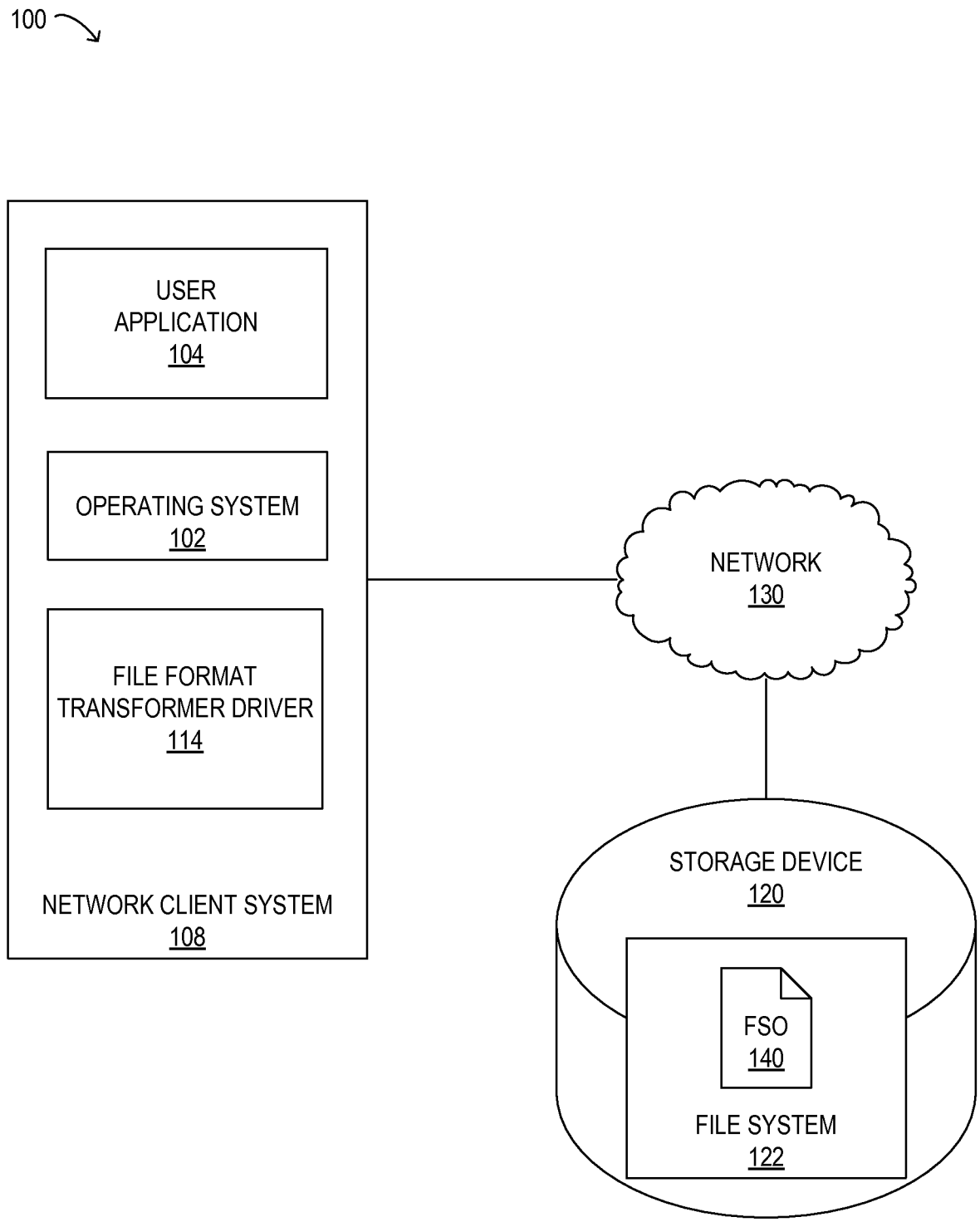
FIG. 1A is a block diagram of selected elements of a file format management system.

In one aspect, a disclosed method for managing file system objects includes receiving a request for a file system object from an application and accessing the file system object. The request may imply a first data format for the file system object, while the file system object may be stored in a second data format on a storage device. The method may further include converting at least a portion of the file system object from the second data format to the first data format, and sending at least a portion of the converted portion of the file system object in the first data format to the application. The file system object may represent a storage partition, a file, a directory, a subdirectory, a storage volume, a randomly addressable storage location, or a combination thereof.

In particular embodiments, the method may further include receiving a request for the file system object from a second application, wherein the request implies a third data format for the file system object, converting at least a portion of the file system object from the second data format to the third data format, and responsive to the request, sending at least a portion of the converted file system object in the third data format to the second application. The third data format may be different from the first data format. The method operations for accessing the file system object may further include determining a file system identifier for the file system object. The file system identifier may be usable to access a storage location on the storage device for operations on file system objects. The operations may include creating, opening, reading, writing, deleting, closing, or a combination thereof. The method operations for converting may further include determining a conversion algorithm based on metadata included in the file system object, and performing the converting operation based on the conversion algorithm. The request from the application may be received via an operating system instruction to a file system driver.

In given embodiments, the method may further include responsive to the request receiving at least a portion of the file system object in the first data format from the application. The method may also include converting the portion of the file system object from the first data format to the second data format, and sending the converted portion of the file system object to the storage device in the second data format.

In another aspect, a disclosed computer system for managing access to file system objects may include a processor configured to access first memory media, and second memory media accessible by the processor and configured to store file system objects, including the file system object. The first memory media may include processor executable instructions to receive a request for the file system object from an application, access the file system object, and, responsive to the request, enable the application to access the file system object in the first data format. The request may imply a first data format for the file system object. The file system object may be stored in a second data format on the second memory media. At least a portion of the file system object may be converted from the second data format to the first data format or from the first data format to the second data format. The file system object may represent a storage partition, a file, a directory, a subdirectory, a storage volume, an addressable storage location, or a combination thereof.

In some embodiments, the computer system may further include a network adapter accessible by the processor, while the processor instructions may further to receive the request from the application via the network adapter. The first memory media may further include processor instructions to access the file system object from the second memory media via the network adapter. The second memory media may be a logical storage device associated with a network file system. The first memory media may further include processor instructions to receive the request for the file system object via an operating system executing on the computer system. The processor instructions to enable the application to access the file system object may include processor instructions to access a storage location on the second memory media for operations on file system objects. The operations may include creating, opening, reading, writing, deleting, closing, or a combination thereof.

In yet another aspect, disclosed first computer-readable memory media include processor instructions for providing access to a file system object. The instructions may receive a request for the file system object from an application, access the file system object, and, responsive to the request, enable the application to access the file system object in the first data format. The request may imply a first data format for the file system object. The file system object may be stored in a second data format on second memory media. At least a portion of the file system object may be converted from the second data format to the first data format or from the first data format to the second data format. The file system object may represent a storage partition, a file, a directory, a subdirectory, a storage volume, a randomly addressable storage location, or a combination thereof.

In certain embodiments, the first memory media may further include instructions to receive the request from the application via an operating system instruction. The instructions to access the file system object may further include instructions to access a storage location on the second memory media for operations on file system objects. The operations may include creating, opening, reading, writing, deleting, closing, or a combination thereof. The first memory media may further include instructions to receive the request from the application via a network connection. The first memory media may still further include instructions to access the file system object via a network connection.

In the following description, details are set forth by way of example to facilitate discussion of the disclosed subject matter. It should be apparent to a person of ordinary skill in the field, however, that the disclosed embodiments are exemplary and not exhaustive of all possible embodiments.

Throughout this disclosure, a hyphenated form of a reference numeral refers to a specific instance of an element and the un-hyphenated form of the reference numeral refers to the element generically or collectively. Thus, for example, widget 12-1 refers to an instance of a widget class, which may be referred to collectively as widgets 12 and any one of which may be referred to generically as a widget 12.

Turning now to the drawings, FIG. 1A is a block diagram of selected elements of file format management system 100. File format management system 100 represents an example architecture for performing file format management. In particular, file format management system 100 represents a network-implementation of file format management.

In FIG. 1A, file format management system 100 is shown including network client system 108, which represents a computing environment configured to access storage device 120 via network 130. Although a single instance of network client system 108 is shown in FIG. 1A for clarity, it will be appreciated that network 130 may support multiple instances of network clients at various locations. In numerous embodiments, network client system 108 may be implemented as a general purpose computing device, such as computing device 600 (see FIG. 6). Network client system 108 may be configured to load and execute various functional modules, which may represent software modules comprising executable code and/or executable instructions. In FIG. 1A, network client system 108 is shown including user application 104, operating system 102, and file format transformer driver 114, which may represent specific software modules. Operating system 102 may represent an operating platform for executing other programs, such as user application 104. For example, operating system 102 may be a UNIX or UNIX-like operating system, a Windows® family operating system, or another suitable operating system. Operating system 102 may also be extensible with drivers for accessing certain hardware or logical components. A driver may support access to a certain component via an operating system instruction. File format transformer driver 114 may represent a driver for accessing data objects on storage device 120, as will be described in further detail below.

In FIG. 1A, network client system 108 may access network 130 via a fixed or wireless communication link. Network 130 may itself be a public network, a private network, or a combination thereof. In particular, network 130 may provide network client system 108 with access to storage resources for storing, retrieving, and organizing data. The configuration of network 130 for this purpose may be one of many types of network architectures, such as, but not limited to, a storage area network (SAN), network attached storage (NAS), and peer-to-peer storage. In certain embodiments, network 130 may also represent a local network supporting direct attached storage (DAS). Storage device 120 represents an exemplary storage medium, or memory medium, that may be accessed by network client system 108 via network 130. Storage device 120 may include its own computing and communication resources (not shown in FIG. 1A) for managing a number of mediums, devices, and internal topologies.

As shown in FIG. 1A, storage device 120 may be configured with file system 122, which may be any one of a number of types of file systems. Although file system 122 is depicted in FIG. 1A residing on storage device 120 for clarity, it is noted that, in some embodiments, portions or components of file system 122 may be included with network client system 108. File system 122 may be configurable for creating volumes and hierarchical file systems to organize data stored on storage device 120. In this manner, file system 122 may enable data stored on storage device 120 to be externally accessed in a hierarchical representation (i.e., as directories, subdirectories, and files) while internally managing and mapping the hierarchical representation to a logical representation. The logical representation may be based on randomly accessible storage locations in a formatted volume and/or storage partition (not shown in FIG. 1A) created on storage device 120 by file system 122. As used herein, a data object in a hierarchical representation of a file system is referred to as a "file system object" (FSO). An FSO may represent any one of a variety of data objects, such as a storage partition, a file, a directory, a subdirectory, a storage volume, and an addressable storage location.

In FIG. 1A, file system 122 is shown including exemplary FSO 140, which may be accessed by user application 104. For example, FSO 140 may represent a data file or a document that user application 104 is configured to load and/or process. FSO 140 may include user-specific data in a number of different data formats. In many instances, user application 104 may be limited in the types of data formats that can be processed. By storing FSO 140 in a data format specific to user application 104, access to FSO 140 by other applications (not shown in FIG. 1A) may be restricted.

In file format management system 100, file format transformer driver 114 may be installed on network client system 108 under operating system 102 as a driver for accessing file system 122. It is noted that in certain embodiments, file format transformer driver 114 may itself be a component of file system 122. Other drivers (not shown in FIG. 1A) for operating system 102 associated with file system 122 may also reside on network client system 108. To provide file format management, file format transformer driver 114 may be configured to access FSO 140 in a given data format and convert FSO 140 to a format expected by user application 104. The given data format for FSO 140 may be an internal data format determined by file format transformer driver 114. File format transformer driver 114 may further be configured to provide access to FSO 140 in a number of different external data formats. The access to FSO 140 handled by file format transformer driver 114 may involve respective data format conversion in either direction (i.e., for reading from or for writing to FSO 140).

Figure 1B:
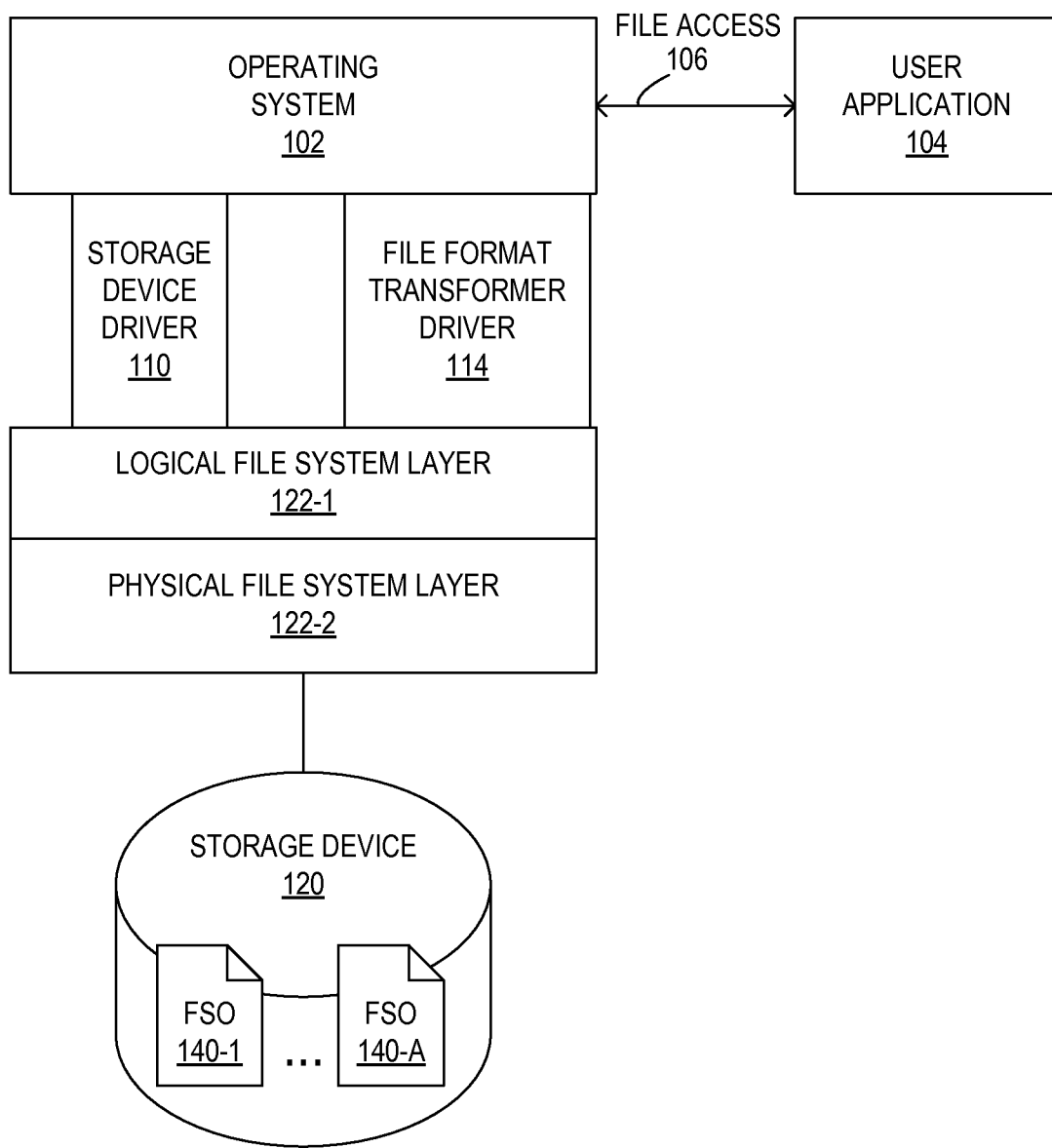
FIG. 1B is a block diagram of selected elements of a file format management system.

Referring now to FIG. 1B, a block diagram of selected elements of file format management system 101 is illustrated. File format management system 101 represents an example architecture for performing file format management. In particular, file format management system 101 represents aspects of a local implementation of file format management. It is noted that like-numbered elements in FIG. 1B represent substantially similar elements depicted in FIG. 1A.

Figure 6:
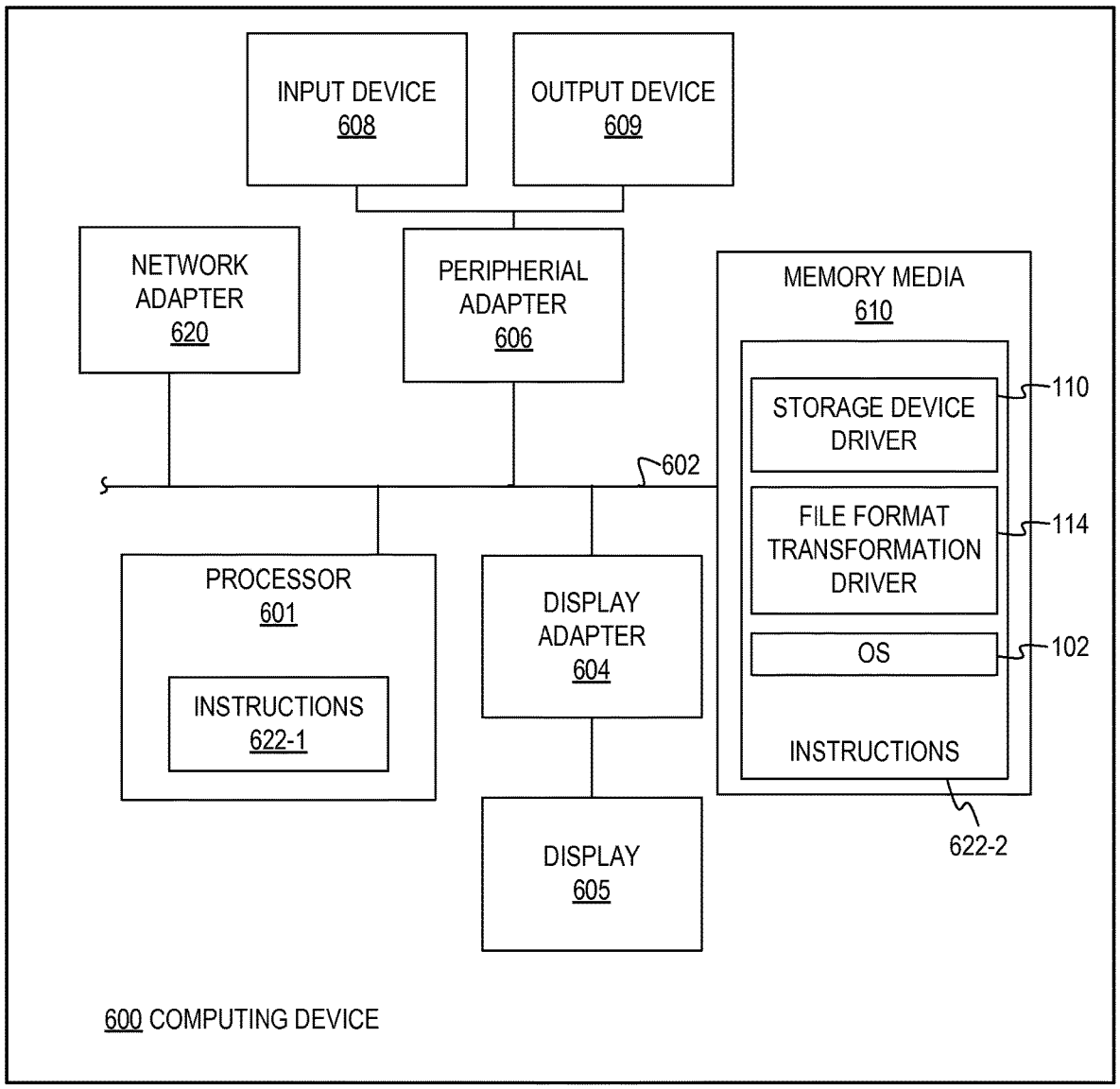
FIG. 6 is a block diagram of selected elements of an embodiment of a computing device.

In FIG. 1B, file format management system 101 may be implemented on a general purpose computing device, such as computing device 600 (see FIG. 6). In various embodiments, certain elements included in file format management system 101 may also be implemented remotely, such as via a network connection or other communication link. For example, user application 104 may be executed on a different computing device than operating system 102, such that file access 106 occurs via a remote communication link. In another example, certain portions of storage device 120 may be remotely accessed by operating system 102.

In file format management system 101 shown in FIG. 1B, user application 104 may be configured to access FSO 140-1 by means of file access 106 provided by operating system 102. File access 106 may represent operating system instructions or commands for accessing FSO 140-1 or other FSOs. Operating system 102 may be configurable or extensible with drivers (or plug-ins) for specific functionality, such as storage device driver 110 and file format transformer driver 114. It is noted that additional types of drivers for additional types of devices (not shown in FIG. 1B) may be implemented with operating system 102. For example, file format transformer driver 114 may represent a driver for operating system 102 to provide functionality according to the methods described herein.

In FIG. 1B, file system 122 (see FIG. 1A) may be represented in two layers as logical file system layer 122-1 and physical file system layer 122-2. Logical file system layer 122-1 may represent a layer in file system 122 that provides a logical interface for a hierarchical data structure, which may include interface functions for file access, directory operations, as well as security and data protection. Physical file system layer 122-2 may represent functionality for managing a physical memory space, such as a set of randomly addressable logical blocks of storage on a memory medium, such as storage device 120. Physical file system layer 122-2 may be responsible for the placement of data in the blocks of storage on the memory medium. Physical file system layer 122-2 may be configured to exchange blocks of data with the memory medium as well as buffer blocks of data exchanged via logical file system layer 122-1. Although logical file system layer 122-1 and physical file system layer 122-2 are shown separately in FIG. 1B, it is noted that some elements of file system 122 may further be included on storage device 120 or a storage system that includes storage device 120.

It is further noted that file system 122 may be extensible using file system drivers, which may interface with logical file system layer 122-1 and/or physical file system layer 122-2. As noted above, file system drivers may provide support for specific modules, elements, or interfaces within operating system 120. For example, storage device driver 110 may provide access to storage device 120 based on device type or device configuration for operating system 102. In this manner, operating system 102 may provide access to a large number of different types of memory media using operating system instructions, while leveraging the capabilities of file system 122 to handle logical and physical data storage operations.

As shown in FIG. 1B, storage device 120 may include a number of FSOs, from FSO 140-1 up to FSO 140-A, where A is any number of data objects. It is noted that user application 104, or other applications, may access any number of FSO 140 on storage device 120. Similar to file format management system 100 shown in FIG. 1A, file format transformer driver 114 may process access requests for FSO 120 via operating system 102 and file system 122. File format transformer driver 114 may be installed as a driver to provide file format management services with file system 122 via operating system 102. It is noted file format transformer driver 114 may extend the functionality of file system 122, and in that sense, may be considered a driver for file system 122. In various embodiments, file format transformer driver 114 may be configured for use with extensible or non-extensible file systems.

In operation, file format management system 101 of FIG. 1B may provide similar functionality to file format management system 100 shown in FIG. 1A. User application 104 may request file access 106 from operating system 102. The request from user application 104 may specify a type of access and a particular FSO. For example, user application 104 may request to read or write portions of FSO 140-1. File access 106 may represent a variety of actions associated with FSO 140, including: creating, opening, reading, writing, deleting, closing, or a combination thereof. The request may be received by file format transformer driver 114, which may convert data from a data format expected by user application 104 to a data format used by file system 122. The conversion may be performed by file format transformer driver 114 in either direction to facilitate either reading or writing of FSO 140-1. In this manner, file format transformer driver 114 may be configured to store FSO 140-1 in an internal data format that may be advantageous for a variety of purposes. For example, file format transformer driver 114 may be configured to 'learn' different data formats and so provide data management services for a number of user applications 104. File format transformer driver 114 may further be configured to provide data conversion services for FSO 140. User application 104 may then rely upon file format transformer driver 114 for supporting various file data formats and may be developed in a simplified form without data conversion features. As a result of implementing file format transformer driver 114, a typical user configuration of a computing environment, which may include numerous different user applications 104, may be simplified and may operate more efficiently, since redundancy among different user applications 104 with respect to data format conversion may be reduced or eliminated.

Figure 2:
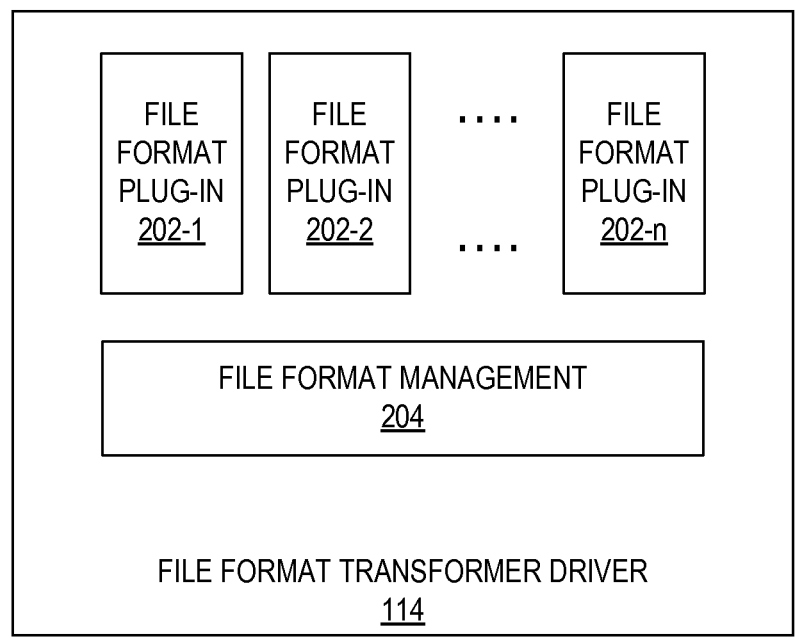
FIG. 2 is a block diagram of selected elements of an embodiment of a file format transformer.

Referring to FIG. 2, a block diagram of selected elements of an embodiment of file format transformer driver 114 are shown. It is noted that in different embodiments, certain elements included with file format transformer driver 114 may be rearranged, added, or omitted, as desired. File format transformer driver 114 is shown including a number of file format plug-ins 202 as well as file format management 204. Specifically, file format plug-in 202-1 may represent information describing a first file data format, file format plug-in 202-2 may represent information describing a second file data format, and so on, up to file format plug-in 202-n, describing an nth file data format. By adding file format plug-ins 202, file format transformer driver 114 may be extensible to support an arbitrary number of different file data formats. File format plug-in 202 may include a description of the structure and contents of a respectively specified data format, such that file format management 204 may be enabled to read, interpret, and write an FSO in the specified data format. For example, file format plug-in 202 may describe metadata and binary contents of an FSO (see also FIG. 3).

As illustrated in FIG. 2, in addition to accessing file format plug-in 202, as described above, file format management 204 may further be configured to convert data files (i.e., perform conversion operations) and manage different file format plug-ins 202. For example, file format management 204 may be configured to characterize file format plug-in 202-1 as being associated with a certain type of FSO 140 (e.g., a document file), and thereby maintain a list of other file format plug-ins that are compatible with file format plug-in 202-1. In certain instances, a conversion operation may result in a conversion using more than two file format plug-ins 202-1, such that an intermediate data format may be utilized to obtain a desired data format. The conversion performed by file format management 204 may be specified by a conversion algorithm (not shown in FIG. 2) that is based on metadata included in FSO 140 (see FIG. 3) and that may be stored and/or managed by file format management 204. File format management 204 may further maintain a desired internal format for certain types of FSOs. It is noted that features included in file format transformer driver 114 may be accessible or extensible or customizable for a specific user environment.

Figure 3:
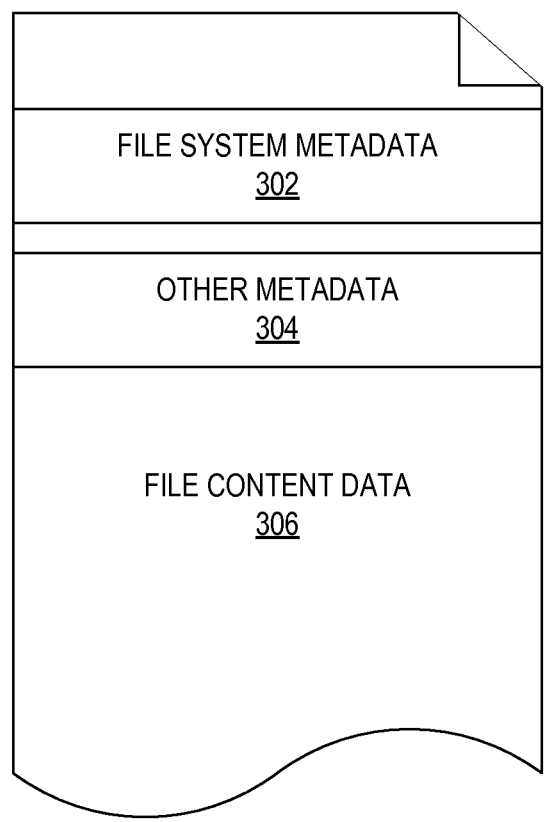
FIG. 3 is a block diagram of selected elements of an embodiment of a file system object.

Turning now to FIG. 3, a block diagram of selected elements of an embodiment of an FSO 140 are shown. In the example embodiment shown in FIG. 3, FSO 140 includes file system metadata 302, other metadata 304, and file content data 306. It is noted that in other embodiments, FSO 140 may include additional elements or may omit certain elements. The arrangement and digital encoding of elements in FSO 140 may also vary according to a desired data format. File system metadata 302 may represent information that is accessed and/or edited by file system 122. In certain instances, improper editing of file system metadata 302 may render FSO 140 inaccessible by file system 122. Accordingly, file system 122 may be configured to restrict access to file system metadata 302, for example, to authenticated file system drivers, such as file format transformer driver 114. Other metadata 304 may represent other types of descriptive information, such as tags, dates, user identifiers, history data, and the like, that may be carried along with FSO 140, or other information describing file content data 306. Other metadata 304 may be added to FSO 140 by an application that generates or edits FSO 140, such as user application 104, and may not be restricted by file system 122. File system metadata 302 or other metadata 304 may be referred to (or specified) by file format plug-ins 202 for describing a particular data format. File content data 306 itself may represent the payload data of FSO 140, also referred to as 'file contents,' and may represent the information that FSO 140 was created to store, notwithstanding file system metadata 302 and other metadata 304. File content data 306 may represent various types of multimedia content, such as binary data, textual data, audio data, image data, and video data, among others.

Figure 4:
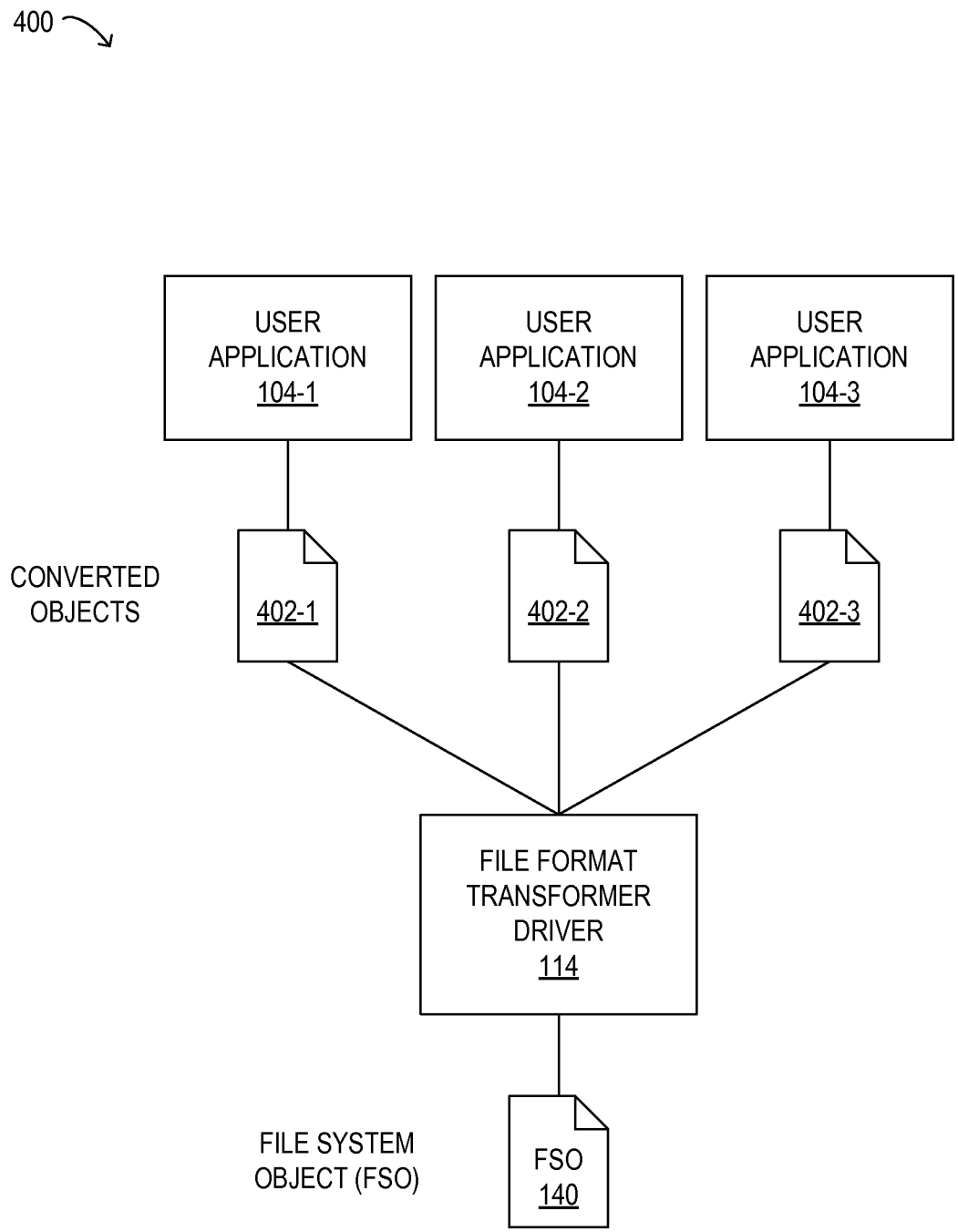
FIG. 4 is a block diagram of selected elements of an embodiment of a file format management system.

Turning now to FIG. 4, a block diagram of selected elements of an embodiment of file format management system 400 is depicted. It is noted that file format management system 400 may represent an implementation using file format management system 100 (see FIG. 1A) and/or file format management system 101 (see FIG. 1B) or combinations thereof. In file format management system 400, file format transformer driver 114 is configured to provide access to FSO 140 to a number of user applications 104, represented by the exemplary instances: user application 104-1, user application 104-2, and user application 104-3. File format transformer driver 114 may be configured to store and maintain FSO 140 in an internal data format, which may not be compatible with user applications 104-1, 104-2, 104-3. When receiving a request for FSO 140 from user application 104-1, file format transformer driver 114 may convert FSO 140 to/from data object 402-1 in a first data format compatible with user application 104-1. When receiving a request for FSO 140 from user application 104-2, file format transformer driver 114 may convert FSO 140 to/from data object 402-2 in a second data format compatible with user application 104-2. When receiving a request for FSO 140 from user application 104-3, file format transformer driver 114 may convert FSO 140 to/from data object 402-3 in a first data format compatible with user application 104-3. Data object 402 may be created and managed by file format transformer driver 114 without being stored within file system 122. In certain instances, though, file format transformer driver 114 may store a copy of data object 402 using file system 122. Each data object 402 may be associated with a respective file format plug-in 202 (see FIG. 2) configured for use with file format transformer driver 114. It is noted that file format transformer driver 114 may further provide access to a number of different FSOs 140, either simultaneously or sequentially or both (see also FIG. 1B).

Figure 5:
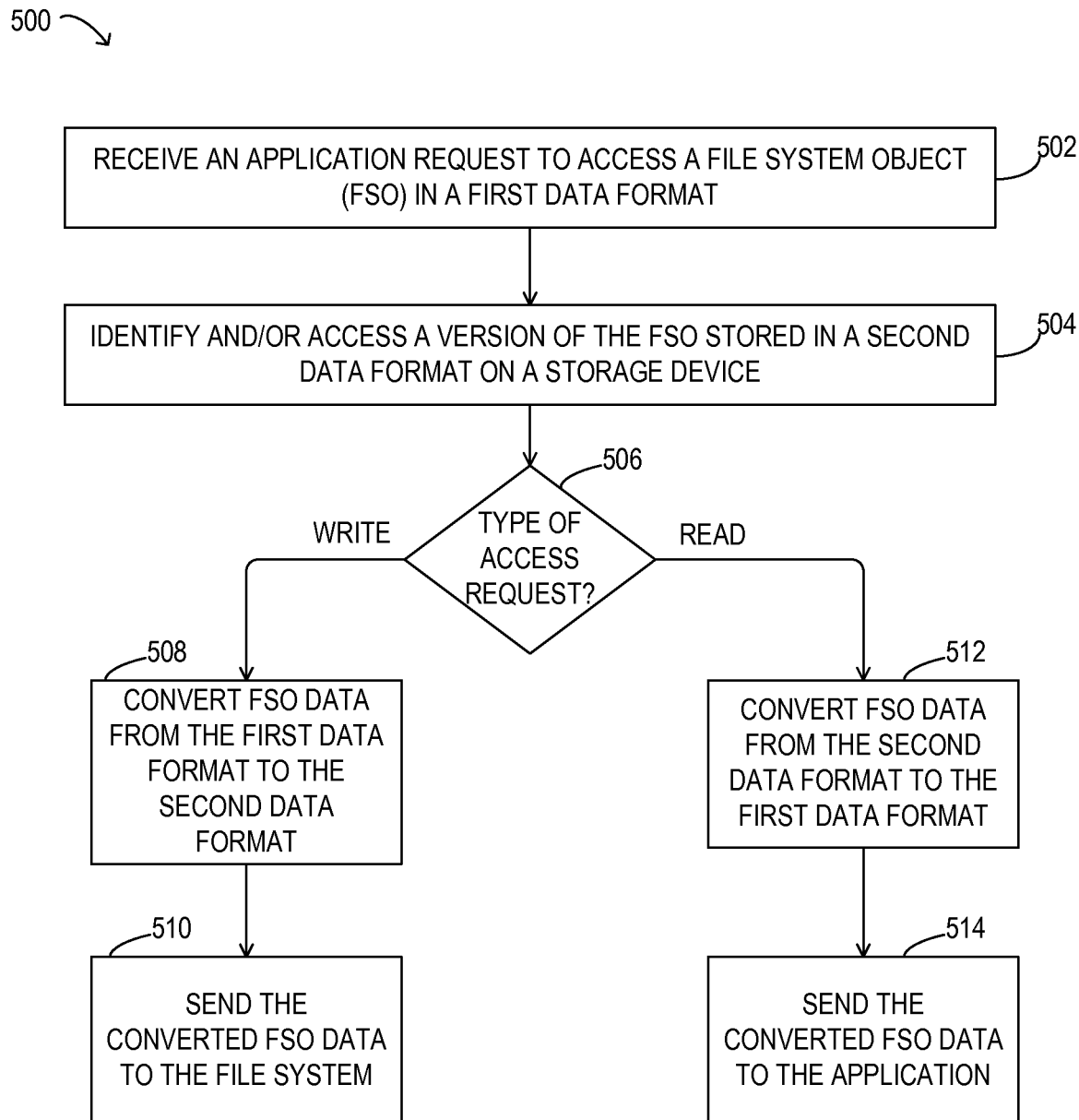
FIG. 5 is a block diagram of selected elements of an embodiment of a file format management process.

Turning now to FIG. 5, a block diagram of selected elements of an embodiment of file format management process 500 is depicted. In certain embodiments, process 500 may represent an instance of operations performed by file format transformer driver 114 (see FIGS. 1A, 1B, 2, and 4). It is noted that certain operations described in process 500 may be optional or may be rearranged in different embodiments.

An application request to access an FSO in a first data format may be received (operation 502). The application request may be received from user application 104 for accessing FSO 140. The first data format may represent a data format that is compatible with user application 104. The application request may specify a type of FSO, thus implying the first data format. It is noted that the first data format may further imply a number of data formats that are compatible among each other according to a certain criteria, but may not necessarily be identical data formats. The application request may be received via an operating system instruction at file format transformer driver 114. A version of the FSO stored in a second data format on the storage device may be identified and/or accessed (operation 504). The second data format may represent an internal format used by file format transformer driver 114. Accessing the FSO may involve, for example, identifying and opening the FSO for further file system operations. The application request received in operation 502 may include an identifier for FSO 140, which may be usable to locate and access FSO 140 within file system 122.

Then in process 500, a decision may be made about the type of access request represented by the application request received in operation 502 (operation 506). If the application request is a WRITE access request, then FSO data may be converted from the first data format to the second data format (operation 508). The FSO data may be received from user application 104 in the first data format and converted to the second data format prior to writing the FSO data to FSO 140. The converted FSO data may be sent to the file system (operation 510). It is noted that operations 508 and/or 510 may represent a single conversion or a series of conversions of portions of FSO data, for example, as a processing operation for a stream of FSO data sent in segments.

Accordingly, operations 508 and/or 510 may be repeated in certain embodiments, as desired.

If the application request is a READ access request, then FSO data may be converted from the second data format to the first data format (operation 512). The FSO data may be read from FSO 140 in the second data format and then converted to the first data format for compatibility with user application 104. The converted FSO data may be sent to the application (operation 514). It is noted that operations 512 and/or 514 may represent a single conversion or a series of conversions of portions of FSO data, for example, as a processing operation for a stream of FSO data sent in segments. Accordingly, operations 512 and/or 514 may be repeated in certain embodiments, as desired.

Referring now to FIG. 6, a block diagram illustrating selected elements of an embodiment of a computing device 600 for performing file format management in conjunction with a file system is presented. In the embodiment depicted in FIG. 6, computing device 600 includes processor 601 coupled via shared bus 602 to processor accessible storage media collectively identified as memory media 610. It is noted that shared bus 602 may be configured to provide access to additional storage devices or memory media (not shown in FIG. 6), such as storage device 120 (see FIGS. 1A and 1B), for example, using network adapter 620, peripheral adapter 606 and/or another means (not shown in FIG. 6).

Device 600, as depicted in FIG. 6, further includes network adapter 620 that interfaces device 600 to a network (not shown in FIG. 6). Device 600, as depicted in FIG. 6, may include peripheral adapter 606, which provides connectivity for the use of input device 608 and output device 609. Input device 608 may represent a device for user input, such as a keyboard or a mouse, or even a video camera. Output device 609 may represent a device for providing signals or indications to a user, such as loudspeakers for generating audio signals.

Device 600 is shown in FIG. 6 including display adapter 604 and further includes a display device or, more simply, a display 605. Display adapter 604 may interface shared bus 602, or another bus, with an output port for one or more displays, such as display 605. Display 605 may comply with a display standard for computer monitors and/or television displays. Standards for computer monitors include analog standards such as video graphics array (VGA), extended graphics array (XGA), etc., or digital standards such as digital visual interface (DVI) and high definition multimedia interface (HDMI), among others. A television display may comply with standards such as National Television System Committee (NTSC), Phase Alternating Line (PAL), or another suitable standard. Display 605 may include an output device 609, such as one or more integrated speakers to play audio content, or may include an input device 608, such as a microphone or video camera.

Memory media 610 encompasses persistent and volatile media, fixed and removable media, and magnetic and semiconductor media. Memory media 610 is operable to store instructions, data, or both. Memory media 610 is shown storing instructions 622-2, which may represent one or more sets of instructions and data structures embodying or utilized by any one or more of the methods and/or operations described herein. It is noted that instructions 622-1 may also reside, completely or at least partially, within processor 601 during execution thereof by computer device 600. It is further noted that processor 601 may be configured to receive instructions 622-2 from instructions 622-1 via shared bus 602. Memory media 610 as shown includes sets or sequences of instructions 622-2, namely, operating system 102, file format transformer driver 114, and storage device driver 110, as described in detail above.

In some embodiments, memory media 610 is configured to store and provide executable instructions for executing file format transformer driver 114, as mentioned previously. For example, file format transformer driver 114 may be configured to execute process 400 and/or method 500. In certain embodiments, computing device 600 may represent an implementation of network client system 108 (see FIG. 1A) or file format management system 101 (see FIG. 1B).

To the maximum extent allowed by law, the scope of the present disclosure is to be determined by the broadest permissible interpretation of the following claims and their equivalents, and shall not be restricted or limited to the specific embodiments described in the foregoing detailed description.

The invention claimed is:

1. A method, comprising:
receiving, by a hardware processor, a request for a file system object, the request for the file system object specifying a write access, a hardware component, and a software application;
determining, by the hardware processor, a software driver associated with the hardware component;
retrieving, by the hardware processor, a block of data associated with the write access; and
converting, by the hardware processor, the block of data from a format used by the software application into a different format used by the software driver;
wherein the block of data is converted for the write access specified by the request for the file system object.

2. The method of claim 1, further comprising determining an identifier associated with the file system object.

3. The method of claim 1, further comprising executing an algorithm for the converting of the block of data.

4. The method of claim 1, further comprising sending the block of data converted into the different format to the software application.

5. The method of claim 1, further comprising sending the block of data converted into the different format to the software driver.

6. The method of claim 1, further comprising sending the block of data converted into the different format to the hardware component.

7. The method of claim 1, further comprising receiving the block of data via a communications network.

8. A system, comprising:
a hardware processor; and
a memory device, the memory device storing instructions, the instructions when executed causing the hardware processor to perform operations, the operations comprising:
receiving a request for a file system object, the request for the file system object specifying a write access, a hardware component, and a software application;
determining a software driver associated with the hardware component specified by the request for the file system object;
retrieving a block of data associated with the write access; and
converting the block of data from a format used by the software application into a different format used by the software driver;
wherein the block of data is converted for the write access.

9. The system of claim 8, wherein the operations further comprise determining an identifier associated with the file system object.

10. The system of claim 8, wherein the operations further comprise executing an algorithm for the converting of the block of data.

11. The system of claim 8, wherein the operations further comprise sending the block of data converted into the different format to the software application.

12. The system of claim 8, wherein the operations further comprise sending the block of data converted into the different format to the software driver.

13. The system of claim 8, wherein the operations further comprise sending the block of data converted into the different format to the hardware component.

14. The system of claim 8, wherein the operations further comprise receiving the block of data via a communications network.

15. A memory device storing instructions that when executed cause a hardware processor to perform operations, the operations comprising:
   receiving a request for a file system object, the request for the file system object specifying a hardware component and a software application;
   determining a software driver associated with the hardware component
   determining at least one of a write access and a read access specified by the request for the file system object;
   retrieving a block of data associated with the file system object;
   executing a conversion associated with the write access, the conversion converting the block of data from a format used by the software application into a different format used by the software driver for accessing the hardware component; and
   executing a different conversion associated with the read access, the different conversion converting the block of data from the different format used by the software driver to the format used by the software application;
   wherein the block of data is differently converted according to the at least one of the write access and the read access specified by the request for the file system object.

16. The memory device of claim 15, wherein the operations further comprise determining an identifier associated with the file system object.

17. The memory device of claim 15, wherein the operations further comprise executing an algorithm that converts of the block of data.

18. The memory device of claim 15, wherein the operations further comprise sending the block of data converted into the format to the software application.

19. The memory device of claim 15, wherein the operations further comprise sending the block of data converted into the different format to the driver.

20. The memory device of claim 15, wherein the operations further comprise sending the block of data converted into the different format to the hardware component.

* * * * *